2,998,291
RECORDING INTEGRATOR
Norman D. Coggeshall, Verona, and Benjamin M. Wedner, Pittsburgh, Pa., assignors to Gulf Research & Development Company, Pittsburgh, Pa., a corporation of Delaware
Filed Nov. 1, 1957, Ser. No. 693,827
1 Claim. (Cl. 346—13)

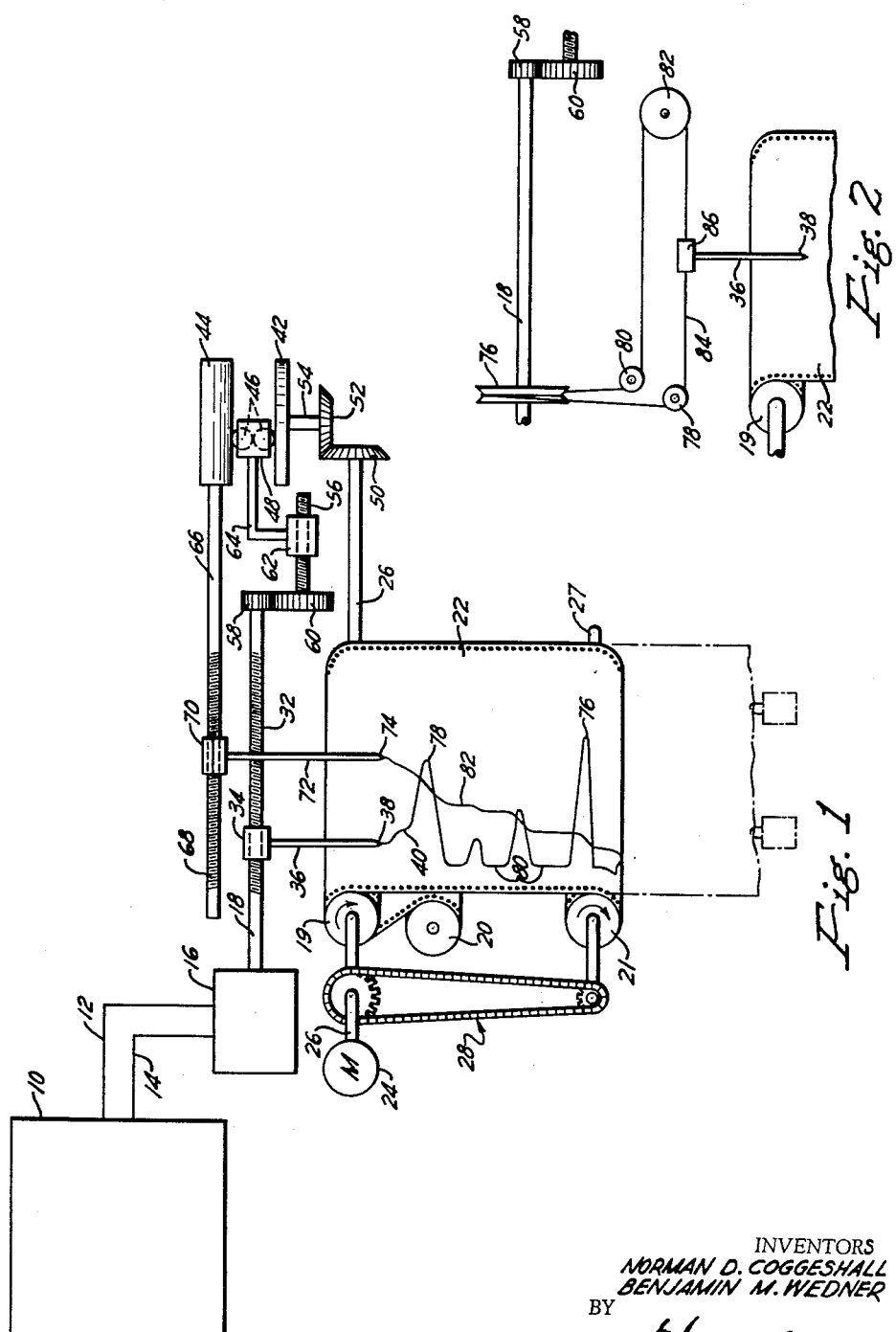

This invention pertains to new and useful improvements in recording systems, and more particularly relates to apparatus for recording upon a single chart both the manner in which a particular variable changes with respect to time and the manner in which the integral of such variable with respect to time varies with time.

Broadly, the invention pertains to the combination of a recorder of the class wherein a pen contacting the chart is driven by the motor of a self-balancing potentiometer with a mechanical integrating device of the class wherein a disk is drivingly coupled by ball means to the cylinder; wherein the disk is rotated at a velocity proportional to the velocity of the chart, the potentiometer is drivingly connected to the ball means of the integrator so that displacements of the pen and ball means occur according to a fixed ratio, and the cylinder is drivingly connected to a further pen contacting the chart so that movement of such further pen is proportional to the angular position of the cylinder.

Apparatus employing the principles of the invention is particularly well suited for use with analytical equipment, such as partition chromatography apparatus of the character that produces an electrical signal having a magnitude dependent upon the value of a variable, such as the concentration of eluted substances carried by the carrier gas in the effluent stream of a partition chromatography column.

The invention will be best understood upon reference to the accompanying drawing, wherein FIGURE 1 is a diagrammatic illustration of a preferred embodiment and wherein FIGURE 2 is a diagrammatic illustration of an alternative pen driving arrangement.

In FIGURE 1, the apparatus of the invention is shown associated with partition chromatography apparatus. The numeral 10 indicates a diagrammatic representation of partition chromatography apparatus which, for example, can be of the type that includes a pair of thermal conductivity cells to produce a voltage having a magnitude substantially proportional to the percentage of eluted material present in the effluent gas stream. Such electrical signal is fed by electric leads 12 and 14 from the chromatography apparatus 10 to a conventional electric self-balancing potentiometer 16. The potentiometer 16 includes an electric balancing motor, not shown, having an output shaft 18.

A chart and drive therefor are provided which comprise a driving roll 19, a supply roll 20, and a take-up roll 21. A sheet of chart paper 22 is wound on the roll 20 and is entrained over the driving roll 19 to the take-up roll 21. The roll 19 is driven at a constant rate of rotation by a synchronous electric motor 24, the output shaft 26 of which is secured to the roll 19. The take-up roll 21 is mounted on a shaft 27 and is driven so as to maintain the chart paper 22 taut between rolls 19 and 21 by means of a sprocket and chain drive indicated at 28 and a slip clutch (not shown) connecting the drive 28 to the shaft 27. As clearly apparent in the drawing, the chart paper 22 has perforations along its edges that engage complementary protuberances on the roll 19 that prevent slipping. Rotation of the rolls 19 and 21 causes the strip chart paper 24 to travel downwardly, as viewed in FIGURE 1.

In practice, the chart paper 22 need not be wound on the roll 21, but simply suspended from the roll 19 with weights attached, as indicated in dashed lines.

The output shaft 18 of the self-balancing potentiometer 16 is threaded, as shown at 32, and a traveling nut 34 is disposed on the threaded portion 32 of the shaft 18. While the shaft 18 is free to rotate in the traveling nut 34, the latter is itself secured against rotation and carries a pen arm 36. The pen arm 36 is provided at its outer extremity with a pen 38 that contacts the chart 22 so as to trace a line 40 on the chart 22.

A mechanical integrating device of conventional character is provided which includes a rotatable disk 42, a cylinder 44 having its axis normal to the axis of rotation of the disk 42, and a variable ratio driving connection between the disk 42 and the cylinder 44 comprising a pair of balls 46 between the disk 42 and the cylinder 44. The balls 46, which constitute a motion transferring means are positioned in a sleeve 48, and are constrained to travel along a path parallel to the axis of the cylinder 44 and normal to the axis of rotation of the disk 42. The mechanical integrating device described is well known and is of the character produced commercially by Librascope Incorporated of Glendale, California.

The disk 42 of the integrating device is provided with means for imparting a constant rotational velocity thereto which comprises a pair of meshing beveled gears 50 and 52 fixed to the shaft 26 and a shaft 54 carried by the disk 42, respectively. It will be readily appreciated that the illustrated arrangement causes the chart 22 to be driven at a constant velocity, as well as causing the disk 42 to be given a constant rate of rotation.

Means are provided for establishing a driving connection between the balancing motor of the potentiometer 16 and the sleeve 48 that controls the position of the balls 46 relative to the radius of the disk 42, such that angular displacement of the shaft 18 is directly proportional to the linear displacement of the sleeve 48. In the preferred construction, such means comprises a threaded shaft 56 and meshing spur gears 58 and 60 establishing a driving connection between the shafts 18 and 56. A traveling nut 62 is positioned on the threaded shaft 56. The threaded shaft 56 is free to rotate in the traveling nut 62, but the latter is otherwise secured against rotation by conventional means, not shown. The threaded shaft 56 is parallel to the axis of the cylinder 44, and it is secured to the sleeve 48 of the integrating device by an L-shaped arm 64.

The cylinder 44 is secured to a shaft 66 that is parallel to the shaft 18, and the shaft 66, which constitutes an output shaft of the integrating device, has a threaded portion, as shown at 68. A traveling nut 70 is positioned on the threaded portion 68 of the shaft 66. While the shaft 66 is free to rotate in the traveling nut 70, the latter is secured against rotation by conventional means, not shown. The traveling nut 70 carries a pen arm 72 that is provided with a pen 74 at its outer extremity that is in contact with the chart 22. The traveling nut 70 is preferably a split nut so that the same can be engaged in any selected position on the threaded portion 68 of the shaft 66.

Inasmuch as translation of the traveling nut 62 must be less than the diameter and normally less than the radius of the disk 42, and inasmuch as the radius of the disk 42 is substantially less than the translation normally imparted to the traveling nut 34 upon rotation of the shaft 18, it will be noted that the spur gear 60 is substantially larger than the spur gear 58 so that the shaft 56 rotates to a substantially lesser extent than the shaft 18, whereby the extent of translation of the balls 46 is conveniently reduced.

The operation of the apparatus will now be readily understood. The self-balancing potentiometer 16 causes the shaft 18 to be rotated to an angular displacement that is linear with respect to the magnitude of the electrical signal produced by the chromatography apparatus. Accordingly, the traveling nut 34 and the pen 38 carried thereby are displaced to the right, as seen in the drawing, to an extent that is linear with respect to the magnitude of the electrical signal feed to the potentiometer 16 by the chromatography apparatus 10. Thus, the line 40 traced upon the chart 22 by the pen 36 represents variations in the magnitude of the electrical signal fed to the potentiometer 16 with respect to time. The time axis is of course the direction of travel of the chart 22. Portions of the line 40, such as those indicated at 76 and 78 represent peaks in the magnitudes of the electrical signal fed to the potentiometer 16, while the portions of the line 40, such as those indicated at 80, represent time intervals during which the electrical signal fed to the potentiometer 16 was of zero magnitude.

The traveling nut 62 is so positioned on the shaft 56 that the balls 46 are at the center of the disk 42 when the shaft 18 is in the angular position that is assumed by the same when the electrical signal fed to the potentiometer 16 is zero. It will be seen that rotation of the shaft 18 from the angular position that it occupies when the magnitude of the electrical signal is zero to that which it occupies when the electrical signal has a positive value will cause the ball 46 to be translated radially outward from the center of the disk 42 to an extent directly proportional to the angular displacement of the shaft 18. It will further be understood that the driving ratio between the disk 42 and the cylinder 44 is zero when the balls 46 are at the center of the disk 42, but that the driving ratio increases upon translation of the balls 46 from the center of the disk 42 in direct proportion to the extent of such translation.

With the particularly illustrated arrangement of the gears 50, 52, 58, and 60 and the particularly illustrated threads on the shaft 18, 56, and 66, the balls 46 are translated to the left during translation of the traveling nut 34 to the right. Also, translation of the balls 46 to the left will result in the shaft 66 being rotated in such a direction that the traveling nut 70 moves to the right. It will also be evident that the integrating function of the disk 42, the balls 46, and the cylinder 44 is such that the extent of translation of the traveling nut 70 to the right is proportional to the integral of the translation of the balls 46 to the left of the center of the disk 42 with respect to time, and is therefore also directly proportional to the integral of the magnitude of the electrical signal fed to the potentiometer 16 with respect to time.

Though only positive values of the electrical signal fed to the potentiometer 16 have been considered in describing the integrating function of the illustrated embodiment of the invention, it will be clear that the integral of negative values for the electrical signal fed to the potentiometer 16 with respect to time are simply subtracted and represented by translation of the traveling nut 70 to the left.

The position of the traveling nut 70 with respect to time is indicated on the chart 22 by the pen 74 tracing the line 82 on the chart 22. It will be appreciated that the pen 74 is positioned slightly below the pen 38 as viewed in the drawing and that the pen arm 72 is so shaped as to avoid any interference between the pen arm 72 on one hand and the traveling nut 34, pen arm 36 and pen 38 on the other. Whenever the pen 74 approaches to near the right-hand side of the chart paper 22, the traveling split nut 70 can be repositioned on the shaft 66 so that the pen 74 is near the left-hand side of the chart paper 22.

In FIGURE 2, there is illustrated an alternative arrangement for driving the pen 38. In this arrangement, the shaft 18 is provided with a pulley 76. Idler pulleys 78, 80, and 82 are provided as shown, with an endless flexible wire or cable 84 constituting a driving belt being entrained over the pulleys 76, 78, 80, and 82 in such a manner that the portion of the cable 84 intermediate the pulleys 78 and 82 is parallel to the driving roll 19. The arm 36 of the pen 38 is secured to cable 84 by a clamping element 86. With this construction, linear movement of the pen is directly proportional to the angular movement of the shaft 18, as in the embodiment of FIGURE 1.

It will be evident that the illustrated embodiment of the invention is susceptible to numerous variations without departing from the scope of the invention. For example, means other than those illustrated can be provided for establishing a driving connection between the motor of the potentiometer 16 and the pen 38, such as is provided in the Leeds and Northrup Recorder—Model G. Also, the driving connection between the shaft 66 and the pen 74 can be such as that shown in FIGURE 2 or that employed between the potentiometer and the pen in the Leeds and Northrup Recorder. If desired, cam means can be employed to establish the described essential driving connection between the motor of the potentiometer 16 and the sleeve 48 such as is employed in the recording system of the commercially available Fisher-Gulf Partitioner. It will be apparent that a substantial variety of alternative means can be provided for driving the disk 42 at a constant rotational velocity such as the provision of a separate synchronous motor, not shown. With any of the modifications suggested, it is only essential that the described relation between the driving element and the driven element be maintained.

Although the illustrated embodiment of the invention has been described in substantial detail, this has been done only for the purpose of conveying a clear conception of the inventive principles involved, rather than to imply a limited scope of the invention. Accordingly, reference should be made to the appended claim in order to ascertain the actual scope of the invention.

We claim:

Recording apparatus comprising in combination a self-balancing potentiometric recording system and a mechanical integrating device; said system including a chart and means for driving the latter at a constant velocity, a first recording pen contacting the chart and means for displacing the first recording pen along a straight path that is transverse to the travel of the contacted portion of the chart by an amount that is linear with respect to the magnitude of a signal fed to the system, such displacing means including a first threaded shaft and a first traveling nut on the first threaded shaft carrying the first recording pen; said mechanical integrating device comprising a rotatable disk and means for rotating the latter at a constant velocity, an output shaft rotatable about an axis normal to the axis of rotation of the disk, motion transferring means establishing a variable ratio frictional driving connection between the disk and the output shaft, said motion transferring means being translatable along a course parallel to the axis of the output shaft and normal to the axis of rotation of the disk; means for translating the motion transferring means comprising a second threaded shaft mounted for rotation, reduction gear means drivingly connecting the first threaded shaft to the second threaded shaft, a second traveling nut on the second threaded shaft operatively connected to the motion transferring means; a second recording pen movably contacting the chart upon a travel path that is parallel to and in closely spaced relation to the straight path of the first recording pen, means for moving the second recording pen comprising a third threaded shaft parallel to the first threaded shaft, said output shaft being drivingly connected to the third threaded shaft, a third traveling nut on the third threaded shaft carrying the second recording pen, and means for selectively positioning the third traveling nut along the length of the third threaded shaft.

References Cited in the file of this patent

UNITED STATES PATENTS

| | | |
|---|---|---|
| 1,041,107 | Ledoux | Oct. 15, 1912 |
| 1,699,807 | Pierce | Jan. 22, 1929 |
| 1,947,731 | Nehls | Feb. 20, 1934 |
| 2,387,563 | Chapple | Oct. 23, 1945 |
| 2,481,039 | Ross | Sept. 6, 1949 |
| 2,724,631 | Ruhland | Nov. 22, 1955 |
| 2,834,247 | Pickels | May 13, 1958 |